April 30, 1963   J. H. BURROUGHS   3,087,413
AUTOMATIC CORN POPPER
Filed May 1, 1961   2 Sheets-Sheet 1
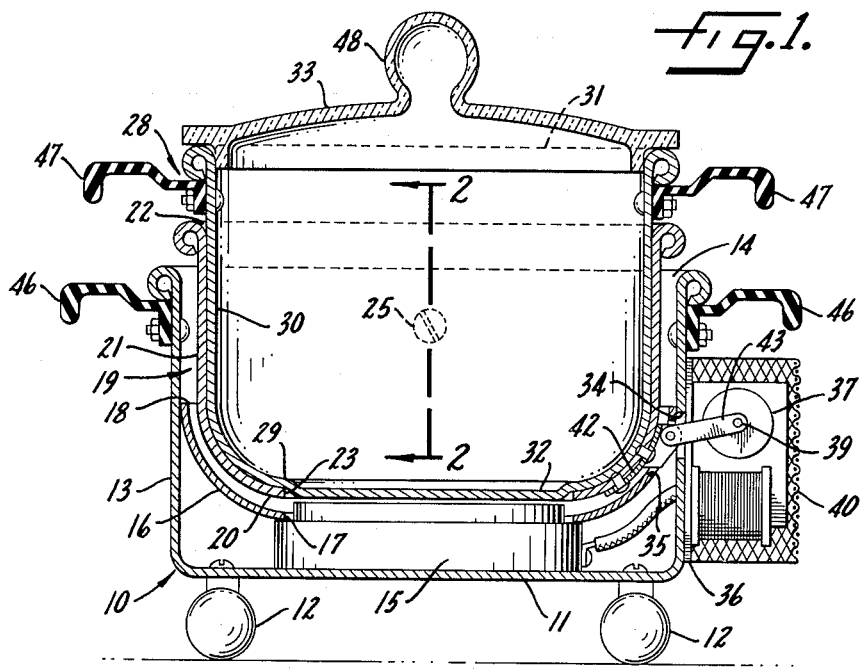
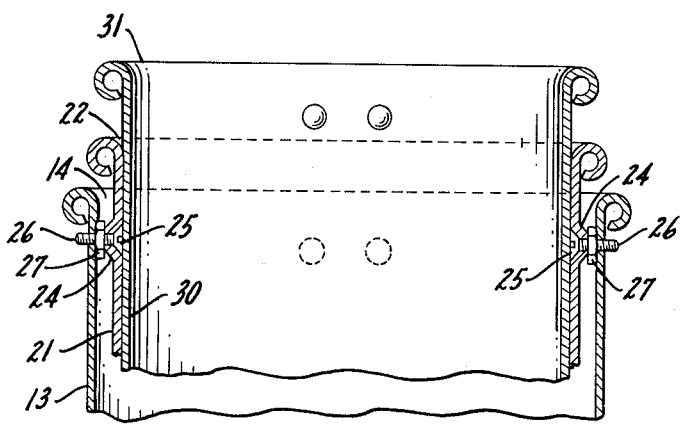
INVENTOR.
John H. Burroughs,
BY Harold B. Hood
Attorney.

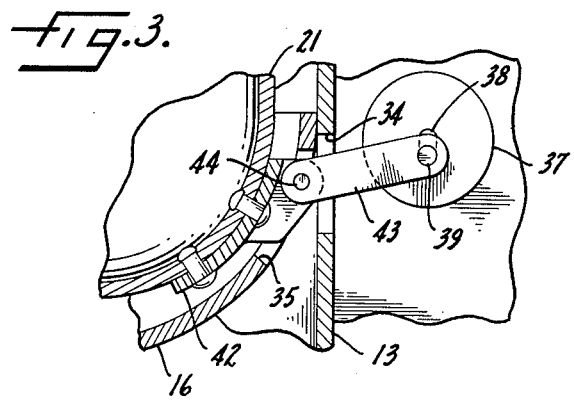
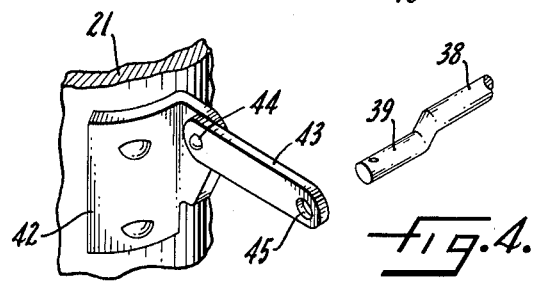
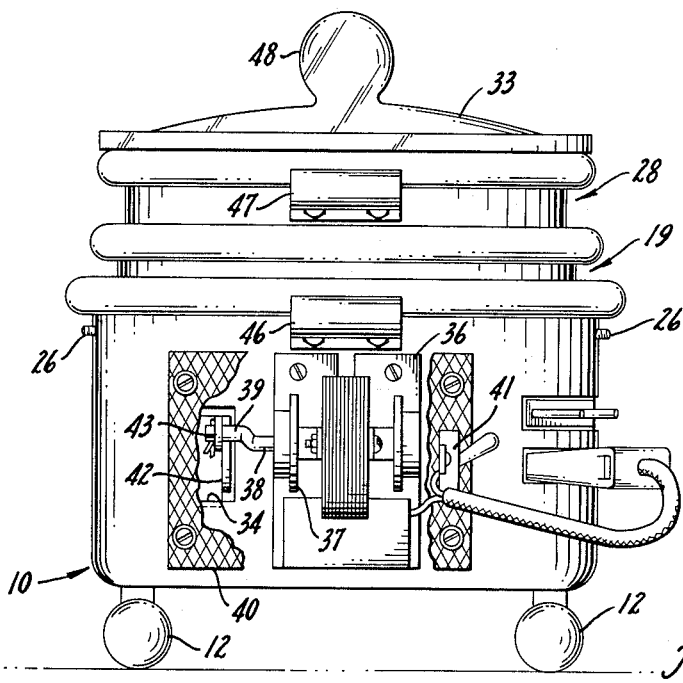

United States Patent Office 3,087,413
Patented Apr. 30, 1963

3,087,413
AUTOMATIC CORN POPPER
John H. Burroughs, 1219 E. 10th St., Indianapolis, Ind.
Filed May 1, 1961, Ser. No. 106,669
4 Claims. (Cl. 99—238.1)

In the early years of the present century, popped corn was a "family" delicacy, usually prepared in the evening as a treat for the family gathered around the fireplace. The utensil universally used for popping corn was a covered pan carried on a long handle so that the pan could be held over an open fire while the user sat far enough away from the fire to be comfortable. The bottom of the pan was sparsely covered with corn, the pan lid was closed and then the pan was held over the fire stationarily until the corn began to get warm. Then, the corn was agitated, by rapid substantially axial reciprocation of the handle, substantially throughout the "popping" period.

Today, open fireplaces are not found in most homes, and the trend everywhere is toward electrification and automation. Numerous forms of household poppers, electrically heated and in some cases power operated, have heretofore been proposed; but in most of such devices, the means for agitating the corn during the popping cycle have constituted rotating stirring devices mounted in some fashion within the corn receptacle. Such devices create, of course, a cleaning problem; and furthermore their action upon the corn is quite different from the action achieved by the reciprocation of the old-fashioned corn popper.

The present invention relates to an automatic corn popper and is particularly concerned with the provision of a device which shall overcome the disadvantages of previously known automatic corn poppers and which will closely approximate the action upon the corn of the above-described old-fashioned corn popper.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a vertical section through an automatic corn popper constructed in accordance with the present invention;

FIG. 2 is a fragmental section taken substantially on the line 2—2 of FIG. 1;

FIG. 3 is an enlarged, fragmental section taken in the plane of FIG. 1;

FIG. 4 is a fragmental, exploded perspective showing details of the drive mechanism; and FIG. 5 is a side elevation, taken from the right of FIG. 1, with parts broken away for clarity of illustration.

Referring more particularly to the drawings, it will be seen that I have illustrated a cup-shaped base indicated generally by the reference numeral 10 and comprising a floor 11, preferably supported upon a plurality of feet 12, and an upstanding perimetral wall 13 defining an upwardly opening mouth 14. Centrally supported upon the floor 11 within the base 10 is a conventional electric heating unit 15; and an annular, concavo-convex reflector 16 is preferably arranged within the base with its internal periphery 17 closely surrounding the unit 15 and its external periphery 18 welded or otherwise secured to the upstanding wall 13 of the base 10.

A cradle, indicated generally by the reference numeral 19, is formed to provide a floor 20 and an upstanding perimetral wall 21 defining an upwardly opening mouth 22. The floor 20 of the cradle 19 is preferably centrally ported as at 23. At diametrically opposite points near its open mouth, the wall 21 is formed with perforated dimples 24 arranged to receive the frusto-conical heads 25 of machine screws 26 whose shanks penetrate the dimple perforations and project radially outwardly from the wall 21. Nuts 27 are threaded on the screws to hold the same in place with their heads substantially flush with the internal surface of the wall 21. The screw shanks 26 are coaxial and constitute trunnion means penetrating suitable perforations in the wall 13 of the base 10, whereby the cradle 19 is supported from said wall for oscillation about the common axis of said screw shanks 26. It will be perceived that said common axis is located near the mouth 22 of the cradle and a substantial distance above the floor 20 thereof, so that oscillation of the cradle about the shank axis produces substantially horizontal vibration of the cradle floor. It will also be seen that the external diameter of the cradle is significantly less than the internal diameter of the base, whereby such oscillation is permitted.

A cup-shaped corn receptacle is indicated generally by the reference numeral 28 and comprises a floor 29 and an upstanding perimetral wall 30 defining an upwardly opening mouth 31. Preferably, the floor 29 of the receptacle 28 is formed to define an offset portion 32 registering with the port 23 in the floor of the cradle 19 and disposed closely adjacent the heating element 15. A preferably transparent cover 33 snugly fits the mouth 31 of the receptacle 28 to close the same. As is clearly illustrated, the receptacle 28 is proportioned and designed to fit snugly within the cradle 19.

At a point 90° removed from the axis of the screw shanks 26, the base is formed with a port 34, and the reflector 16 is formed with a registering port 35. A plate 36 is suitably secured externally to the base wall 13 and carries a rotary electric motor 37 whose spindle 38 is formed with a crank arm 39. Preferably, a reticulate shield 40 encloses the motor 37, and a switch 41 dominating the energizing circuit for said motor is preferably exteriorly mounted on said shield.

At a point in registry with the ports 34 and 35, an L-shaped bracket 42 is secured to the external surface of the cradle 19. A link or pitman 43 has one end pivotally secured as at 44 to the bracket 42 and is formed at its opposite end with an opening 45 penetrated by the crank 39 of the motor spindle 38. It will be apparent that, when the motor 37 is energized, the drive connection just described will act to rock the cradle 19 about the axis of the screw shanks 26.

In use, an appropriate amount of popping corn will be deposited in the receptacle 28 either before or after that receptacle is nested in the cradle 19 in the relationship illustrated in FIG. 1. The cover 33 is now placed on the receptacle and the heating element 15 will be energized. When the corn within the receptacle has been warmed to a point at which it is ready to begin to pop, the switch 41 is actuated to energize the motor 37 to rock the cradle, and the receptacle 28, about the axis of the screw shanks 26, thereby agitating the corn within the receptacle in a manner closely analogous to that achieved in the old-fashioned hand corn popper.

When all of the corn in the receptacle has been popped, the motor 37 and the heater 15 will be deenergized and the receptacle 28 may be lifted out of the cradle 19, heat-insulating handles 47 preferably being mounted on said receptacle. Similar handles 46 are preferably provided on the base 10. The cover 33 is preferably provided with a knob 48, as shown.

It will be seen that, because the receptacle 28 is bodily agitated by movement of the cradle 19, it is not necessary to introduce corn-agitating means into the interior of the receptacle. Therefore, the receptacle 28 may be completely smooth in its interior, and therefore may be as readily cleaned as any conventional cooking utensil. The corn never comes into contact with any other parts of the device, so that absolutely sanitary cleaning of such other parts is not essential. On the other hand, the interior of the cradle 19 is readily accessible when the receptacle 28 has been removed therefrom, and is also smooth and easily cleaned; and said cradle is readily removable from the base, if desired, merely by the removal of the screws 25 and disconnection of the link 43 from the motor spindle crank 39.

I claim as my invention:

1. A corn popper comprising a base having upstanding walls, heater means supported at the bottom of said base, a cradle, trunnion means supported from said upstanding walls near the top of said walls, said cradle being mounted to rock about the axis of said trunnion means with the bottom of said cradle adjacent said heater means, a corn receptacle removably received in said cradle, an electric motor externally supported from said base, and means providing an operative connection between said motor and a point on said cradle eccentric relative to said trunnion axis whereby energization of said motor will rock said cradle about said axis.

2. A corn popper comprising a cup-shaped base, heater means supported from the floor of said base, a cradle disposed within said base with its bottom adjacent said heater means and mounted to rock within said base about a substantially horizontal axis near the upwardly-opening mouth of said base, a corn receptacle removably received in said cradle, motor means supported from said base and operatively connected to rock said cradle about said axis, said cradle being cup-shaped and being formed with an opening in its bottom substantially coextensive with and registering with said heater means, and reflector means annularly surrounding said heater means.

3. In a device of the class described, a cup-shaped base having a floor and an upwardly-opening mouth, a heating unit centrally supported on said floor, diametrically opposed, coaxial trunnion means supported from said base adjacent the mouth thereof, a cup-shaped cradle having an upwardly-opening mouth and a ported floor supported from said trunnion means to oscillate about the common axis of said trunnion means with its floor closely adjacent said heater means and the port in its floor substantially coextensive with and in registry with said heater means; a cup-shaped corn receptacle having an open mouth snugly removably received in said cradle, an electric motor externally supported from said base, and means penetrating a wall of said base and providing a driving connection between said motor and a point on said cradle below said trunnion axis whereby said cradle will be rocked about said trunnion axis when said motor is energized.

4. In a device of the class described, a cup-shaped base having a floor and an upwardly-opening mouth, a heating unit centrally supported on said floor, diametrically opposed, coaxial trunnion means supported from said base adjacent the mouth thereof, a cup-shaped cradle having an upwardly-opening mouth and a ported floor supported from said trunnion means to oscillate about the common axis of said trunnion means with its floor closely adjacent said heater means and the port in its floor substantially coextensive with and in registry with said heater means, a cup-shaped corn receptacle having an open mouth snugly removably received in said cradle, a rotary electric motor having a cranked spindle externally mounted on said base with the axis of said spindle parallel with said trunnion axis, and pitman means penetrating a wall of said base and providing a driving connection between the crank of said motor spindle and a point on said cradle below said trunnion axis.

References Cited in the file of this patent

UNITED STATES PATENTS

| | | |
|---|---|---|
| 1,352,225 | Sargent | Sept. 7, 1920 |
| 1,977,482 | Klause | Oct. 16, 1934 |
| 2,194,852 | Gundelfinger et al. | Mar. 26, 1940 |
| 2,640,907 | Morey | June 2, 1953 |
| 2,797,298 | Fujitani | June 25, 1957 |